Sept. 21, 1954

M. LEHMANN 2,689,662

TIMBER-SETTING MINE TRUCK

Filed Sept. 30, 1948

INVENTOR.
Max Lehmann
BY
Geo. B. Pitts
ATTORNEY

Sept. 21, 1954

M. LEHMANN 2,689,662

TIMBER-SETTING MINE TRUCK

Filed Sept. 30, 1948

INVENTOR
MAX LEHMANN
BY
Geo. B. Pitts
ATTORNEY

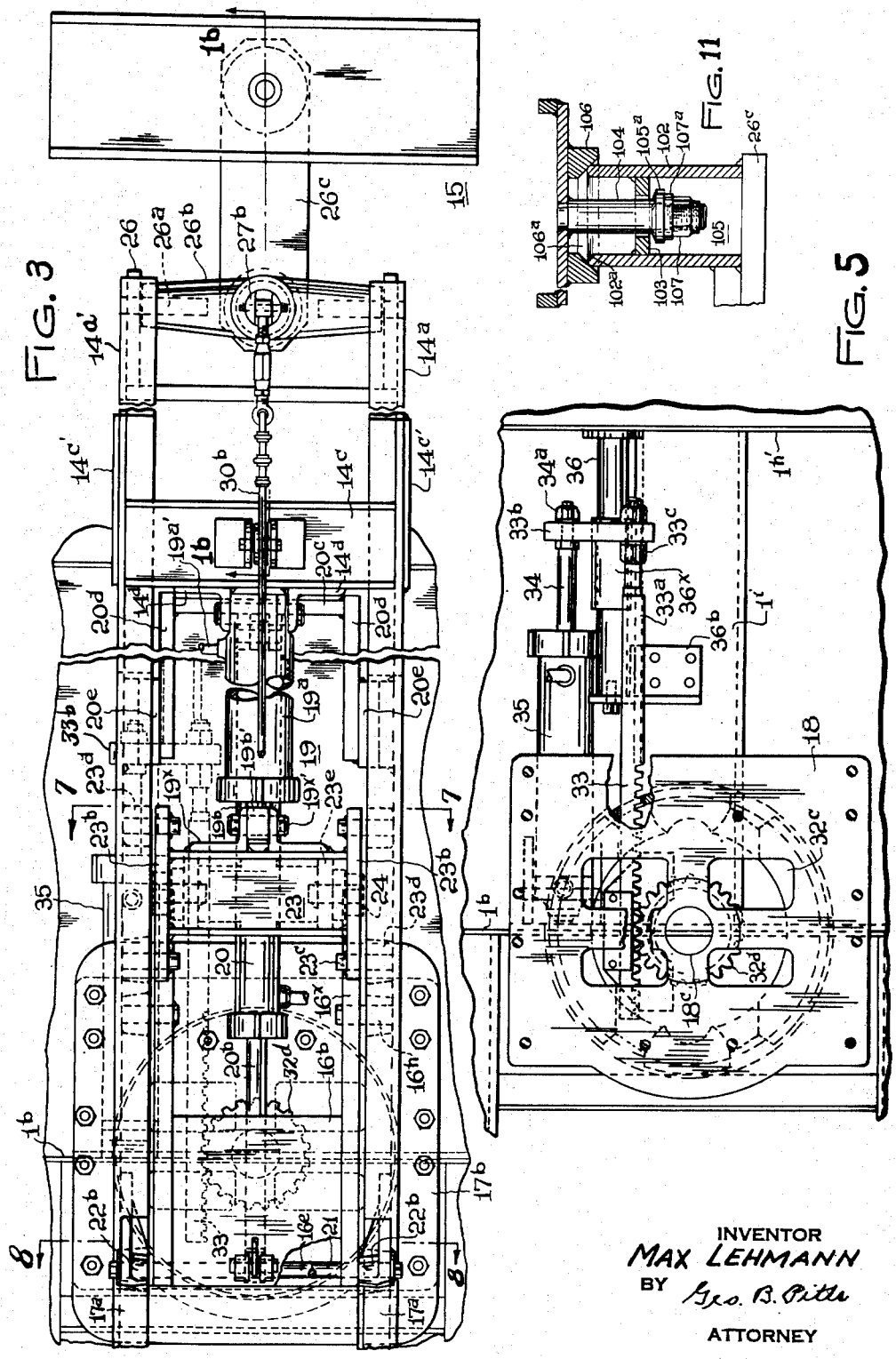

Sept. 21, 1954
M. LEHMANN
2,689,662
TIMBER-SETTING MINE TRUCK
Filed Sept. 30, 1948
7 Sheets-Sheet 4
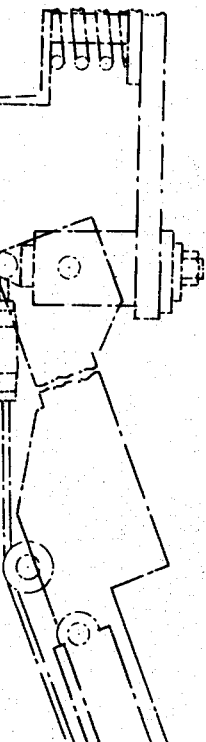
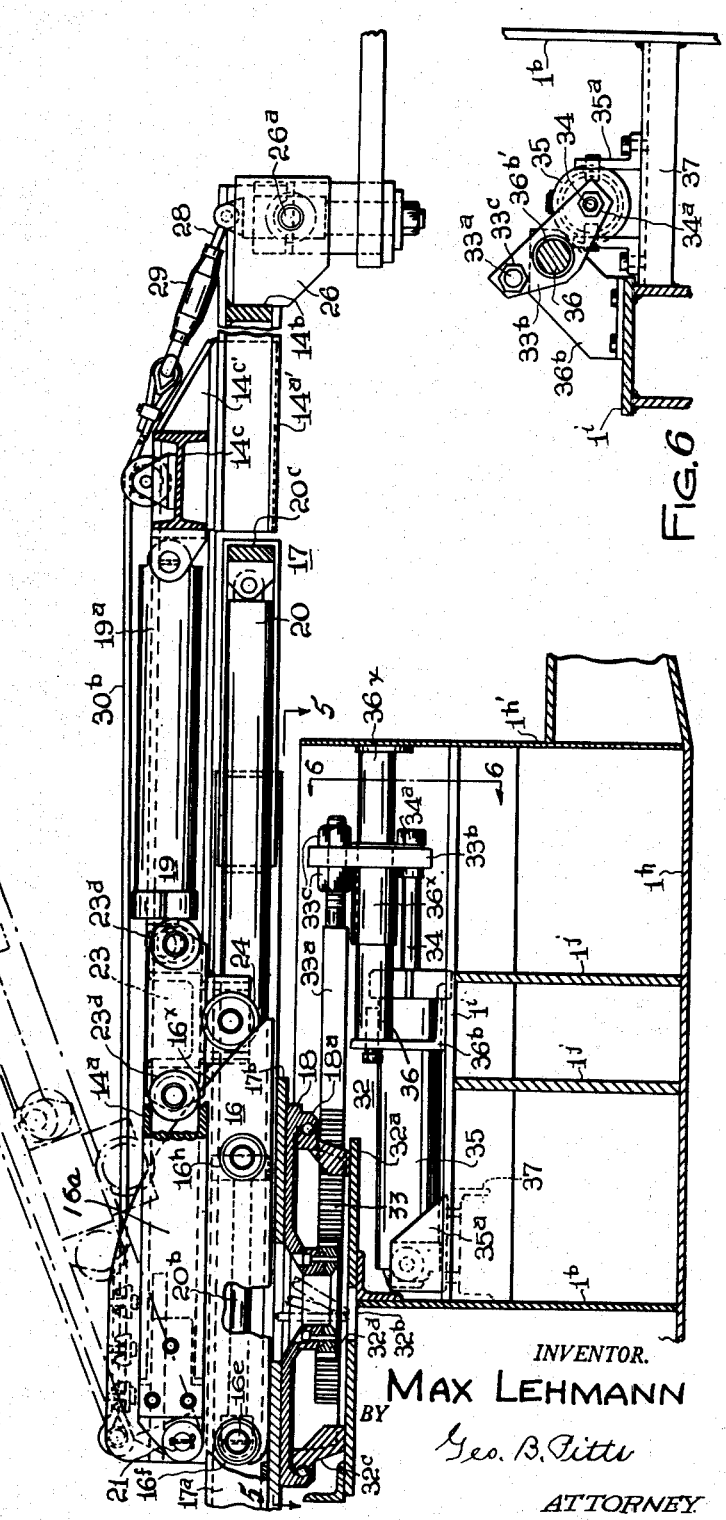
INVENTOR.
MAX LEHMANN
BY
Geo. B. Pitti
ATTORNEY Sept. 21, 1954  M. LEHMANN  2,689,662
TIMBER-SETTING MINE TRUCK
Filed Sept. 30, 1948  7 Sheets-Sheet 5

INVENTOR.
MAX LEHMANN
BY Geo. B. Pitts
ATTORNEY

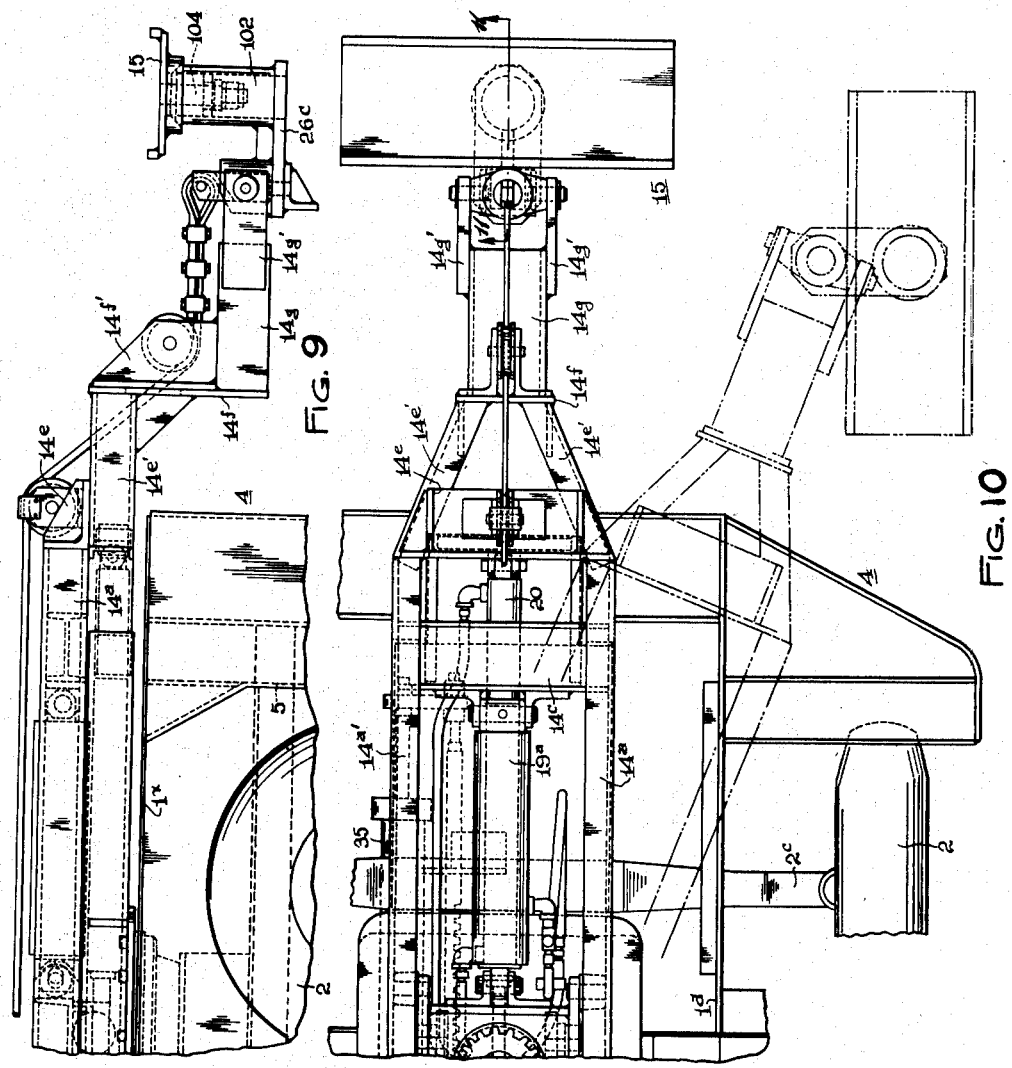

Sept. 21, 1954　　　　　M. LEHMANN　　　　　2,689,662
TIMBER-SETTING MINE TRUCK
Filed Sept. 30, 1948　　　　　　　　　　　　7 Sheets-Sheet 7
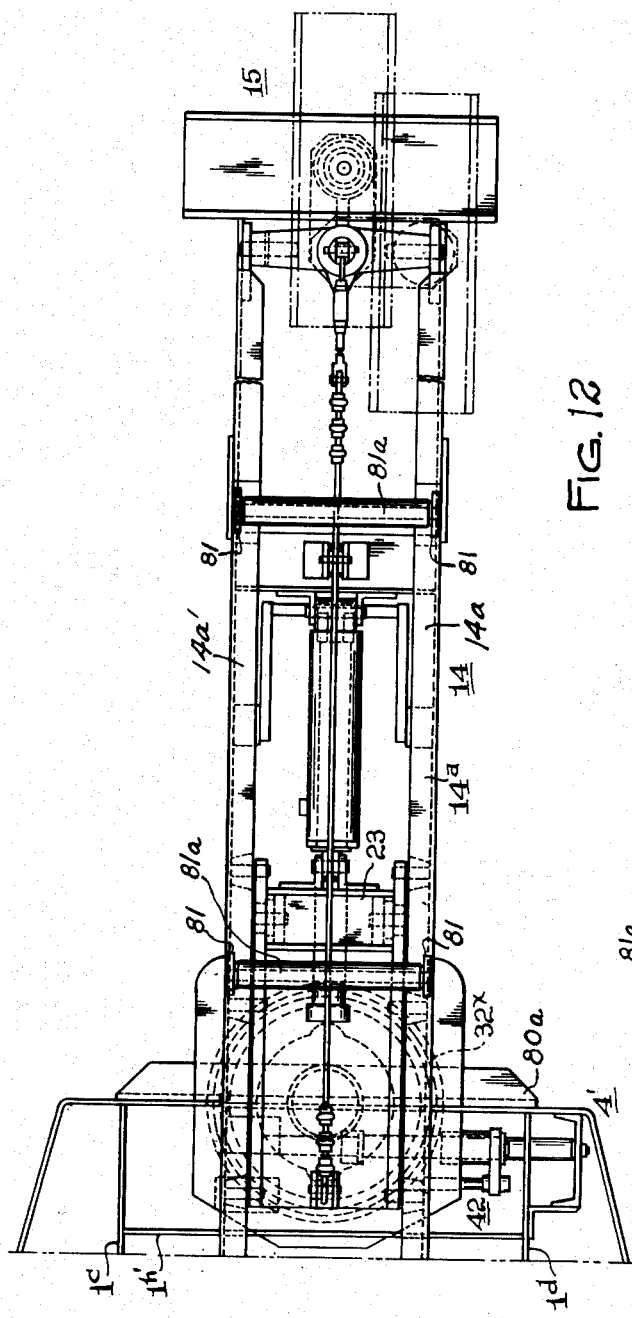
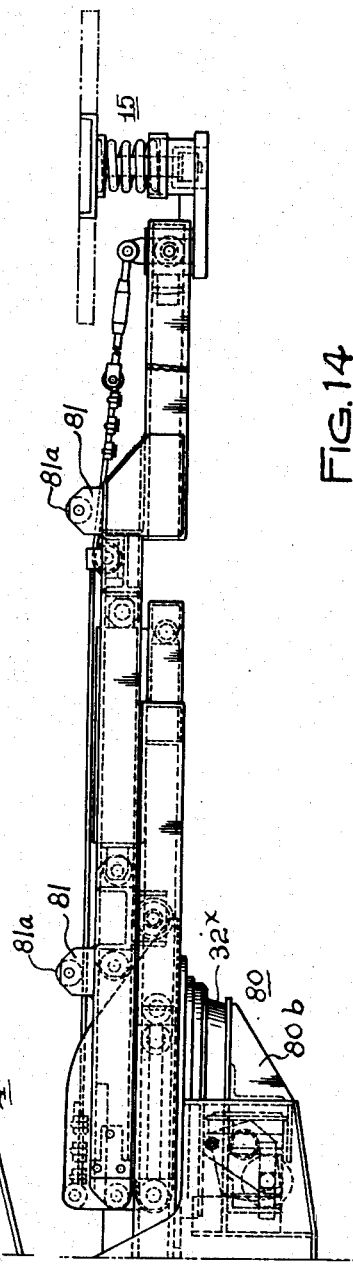
INVENTOR.
MAX LEHMANN
BY
Geo. B. Pitts
ATTORNEY Patented Sept. 21, 1954

2,689,662

UNITED STATES PATENT OFFICE 2,689,662

TIMBER-SETTING MINE TRUCK

Max Lehmann, East Cleveland, Ohio, assignor to The Baker-Raulang Company, Cleveland, Ohio, a corporation of Ohio Application September 30, 1948, Serial No. 51,979

8 Claims. (Cl. 214—148)

This invention relates to a power driven truck advantageously operable in mines, that is, driven into and through the main entry, panel entry and block room of a mine. The form of construction herein disclosed and embodying my invention is particularly adapted for handling and positioning timber and bars for the mine roofs where excavations in the mine have been completed, the truck having a boom for raising the timbers and maintaining them in accurate elevated relation to the mine roof while props therefor are being cut and placed in position. The truck is mounted on rubber tired wheels, which facilitates travel over rough ground usually present in mines and the front wheels are steerably mounted on an axle which is preferably fulcrumed on the truck chassis to permit ready traverse of the wheels over abnormal uneven ground or floor conditions. The timbers are spacedly positioned in relation to the mine roof or ceiling approximately four feet apart center-to-center. Accordingly, the truck must be driven an approximately equal distance for each timber positioning operation; however, as the rough conditions in the ground in a mine following the excavations therein preclude movement or driving of the truck from position to position with any reasonable degree of accurate control without loss of time, provision is made for bodily adjusting the boom rectilineally of the truck chassis and also slewing it (at least through an arc of 90 degrees in either direction) and hence enables the operator to make timber placements with speed and accuracy. The truck includes a chassis constructed to support the truck platform at a low level in overhanging relation to the rear wheels, whereby is provided a large supporting area for timbers and bars readily accessible by operatives disposed or working at the sides of the truck, the power supply and power mechanisms being mounted below the platform, whereby the overall height of the truck is reduced, so that it may be driven through mine areas and the boom operated where overhead conditions are limited. The boom may be disposed in a horizontal position whereby, during truck travel, danger of the boom engaging depending earth, conglomerated rock and deposit formations, protruding side walls, boulders, pillars or other obstructions are eliminated.

One object of the invention is to provide an improved portable mechanism for supplying and positioning ceiling timbers and props in a mine, whereby a large number of ceiling timbers may be positioned in a short period of time and with a minimum number of operatives.

Another object of the invention is to provide in a truck of this character an improved boom having a cradle for supporting a timber and operable to raise the latter into roof engaging position, the boom support being rotatable on a vertical axis and movable rectilineally, whereby the boom may be raised or lowered, and moved relative to the truck chassis to adjust the cradle to position it in the selected location therefor without driving or moving the truck.

Another object of the invention is to provide an improved truck of this character wherein the truck frame or chassis supports the power supply, driving mechanism and control station approximately in a plane below the upper surfaces of the truck wheels to mount a platform for timber and a boom support at a low level, whereby the driver has unobstructed view and manual driving of the truck from place to place in an excavated mine is facilitated, this arrangement providing a large unobstructed surface for the timber and an unobstructed area for slewing of the boom when in horizontal position.

Another object of the invention is to provide in a truck of this type an improved timber handling mechanism consisting of a boom having a cradle at its outer end, the boom being mounted on and swingable upwardly and downwardly relative to a slidable support which is rotatable on a vertical axis, whereby the cradle is adapted to receive a section of material from a source of supply, elevate it and maintain the section in position while being set.

Another object of the invention is to provide an improved truck of this type having a relatively large platform for sections of timber disposed at a low level and a boom having a cradle at its outer end, and mounted to revolve in a plane parallel and adjacent to the plane of said platform into position to readily receive sections of timber when moved off of said platform.

Another object of the invention is to provide an improved truck of this type having a low timber carrying platform and a boom adapted to be positioned horizontally and revoluble substantially in the plane of said platform, whereby transfer of the timber to the mine ceiling is facilitated.

Another object of the invention is to provide in a truck of this type an improved mounting for a swingable boom adapted to be slewed and moved rectilineally and fluid operated means associated with the mounting to swing the boom upwardly and downwardly, slew it and bodily move the boom when in any operated position thereof.

Other objects of the invention will be apparent to those skilled in the art to which my invention relates from the following description taken in connection with the accompanying drawings, wherein Figs. 1 and 1a, taken together (the latter figure being reduced), show a plan view of a truck embodying my invention.

Fig. 3 is a plan view of the boom and timber cradle or carrier, somewhat enlarged.

Fig. 4 is a side elevation of parts shown in Fig. 3, parts being broken away.

Fig. 5 is a fragmentary sectional view on the line 5—5 of Fig. 4.

Fig. 6 is a fragmentary section on the line 6—6 of Fig. 4.

Fig. 9 is a fragmentary side view showing a modified form of construction.

Fig. 10 is a plan view of parts shown in Fig. 9.

Fig. 11 is a section on the line 11—11 of Fig. 10.

Fig. 12 is a fragmentary plan view of another modified form of construction. And Figs. 13 and 14, taken together, show a side elevation of the embodiment shown in Fig. 12.

Figure 1:
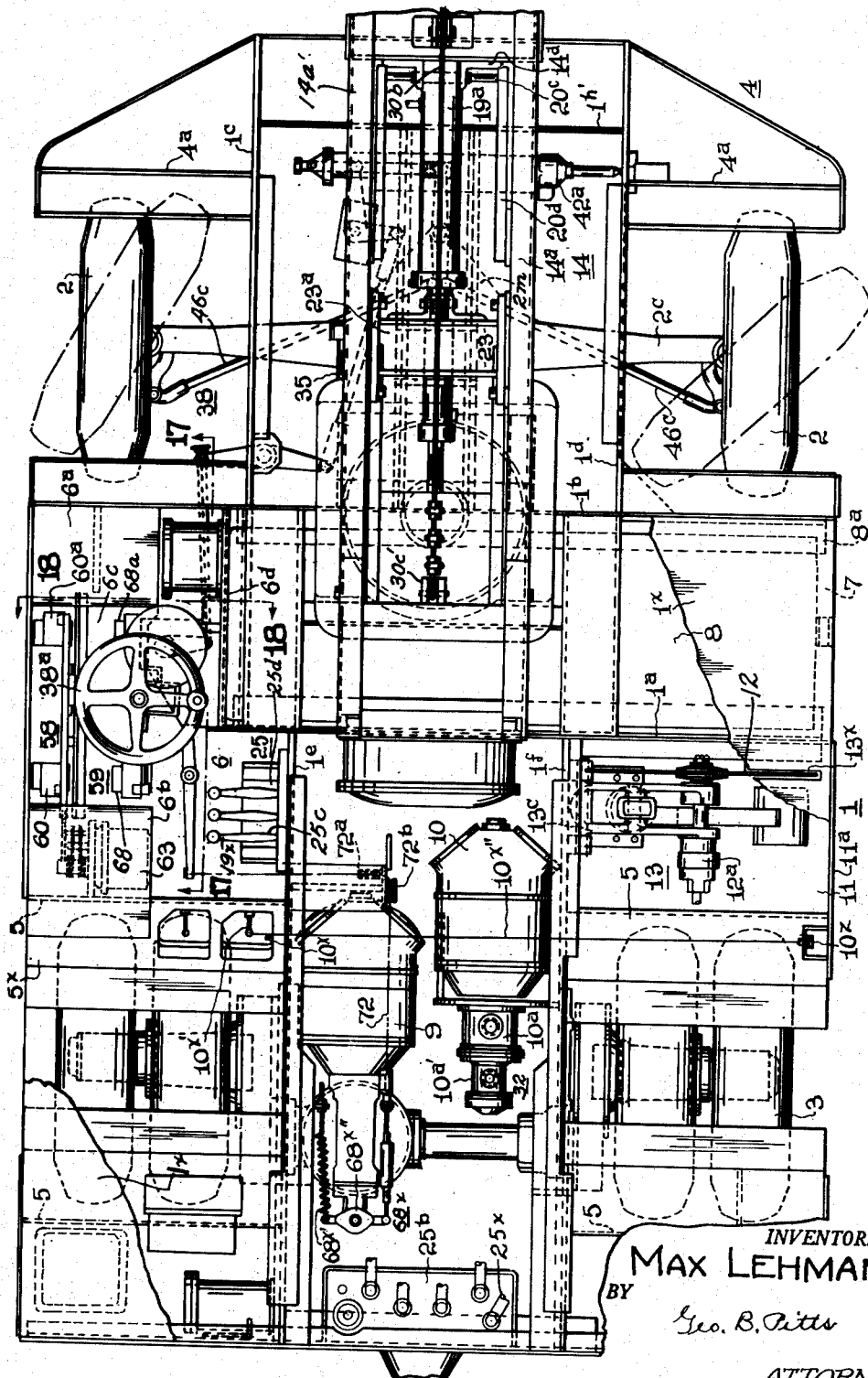
Fig. 1b is a fragmentary section on the line 1b—1b of Fig. 1a, enlarged.

In the drawings, 1 indicates as an entirety the truck chassis consisting of spaced transverse members 1a, 1b, a pair of spaced longitudinal members 1c, 1d, extending forwardly of the member 1b and a pair of spaced longitudinal members 1e, 1f, extending rearwardly from the member 1a, the members 1e, 1f, being connected together at their rear ends by a member 1g. The members referred to consist of vertically disposed plates suitably connected, as by welding operations. The chassis 1 is supported on a pair of steerable front wheels 2 and pairs of rear traction wheels 3. The outer ends of the members 1c, 1d, support a guard 4, which extends laterally at opposite sides thereof beyond the front wheels 2, each lateral portion of the guard having a rear wall 4a which is spaced from the transverse member 1b to accommodate the adjacent front wheel 2 (see Figs. 1 and 2). The longitudinal members 1c, 1d, are connected by a horizontal cross plate 1h (see Figs. 2 and 4) and a vertical cross plate 1h' (see Figs. 1 and 2) and the latter is connected with the transverse member 1b by a bridge member 1i disposed coincidentally with the longitudinal axis of the chassis 1. 1j indicates a pair of spaced plates secured to and disposed between the bridge member 1i and horizontal cross plate 1h. As shown in Fig. 1, the wheels 2 are pivotally mounted on the opposite ends of the axle 2c and operated to effect steering of the truck. The axle 2c is disposed in a plane intermediate the plate 1h and bridge member 1i and extends through the space between the plates 1j. The axle 2c is formed intermediate its ends with a through opening to receive a fulcrum pin (not shown) the opposite ends of which are mounted in aligned openings formed in the plates 1j, whereby the axle 2c is mounted to rock on the longitudinal axis of the chassis 1 to permit the wheels 2 to roll over various uneven surface conditions when being driven in either direction. The axle 2c supports a substantially V-shaped bracket 2m, the legs thereof being rigidly secured to the axle at opposite sides of the plates 1j. The bracket is provided with a rearwardly extending member (not shown) connected through links 46c to the spindles for the wheels 2. The bracket 2m is connected to a hydraulically operated means 42a, which through a linkage indicated at 38, is controlled by the steering device 38a. The form of mechanism for steering the wheels 2 form no part of the invention and therefore is not more fully described.

Figures 1A, 1B, 2:
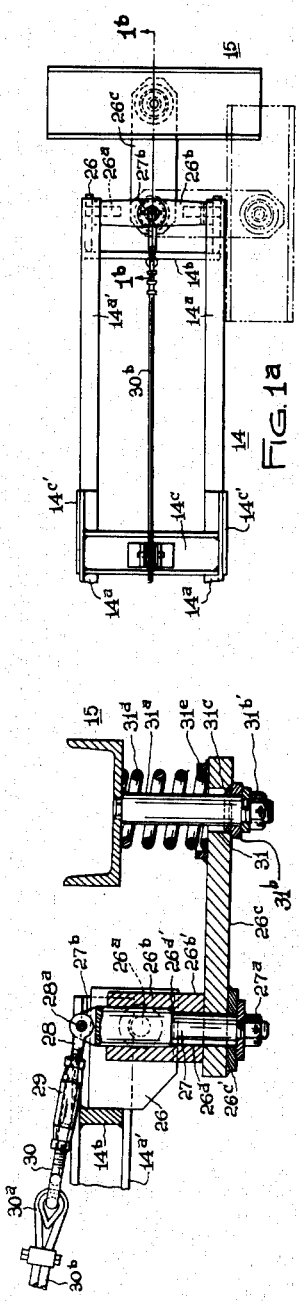
Fig. 2 is a side elevation of Fig. 1, the outer end portion of the boom being omitted.

The longitudinal members 1e, 1f, support pairs of outwardly extending spaced walls 5, which form between them housings for the rear wheels 3. At one side of the chassis 1, outwardly of the member 1e and between the adjacent lateral portion of the member 1b and the adjacent wall 5 I provide a control station 6, having associated therewith or therein (a) various devices and levers the operation of which through valves and other devices, effects driving and braking of the truck, operation of the pump motor 10 and movement and operation of the boom, and (b) front and rear seats 6a, 6b, for the driver, the control station being provided with a flooring 6c connected at its opposite ends to the lower ends of the member 1b and adjacent wall 5, whereby the driver is disposed at a low level. As shown in Figs. 1 and 2, the transverse members 1a, 1b, provide between them a compartment 7 for a battery 8 (supported on angles 8a), which supplies current to a motor 9, drivingly connected to the wheels 3 and the motor 10 for driving pumps 10a, 10a'. The battery compartment 7 extends from the inner side wall 6d of the control station 6 to the opposite side of the chassis 1. Rearwardly of the compartment 7 and between the adjacent walls 1a, 1f, 5, is a compartment 11 in which is mounted a saw 12 for sawing the timbers, a hydraulically operated motor 12a for rotating the saw and a mechanism 13 for raising and lowering the saw. The disclosed mechanism for sawing timbers and props forms no part of the invention for which reason it is not more fully described. As shown in Fig. 2, the driving and other units above referred to are supported by and between the chassis members and the latter terminate at their upper edges in a horizontal plane a short distance above the wheels 2, 3, and supports a platform 1x extending from the transverse member 1a rearwardly and equal in width to the length of the member 1b, except for a section to accommodate the control station 6. In this form of construction and arrangement, a large platform at a low level is provided to support sections of timber, adapted to be cut to predetermined lengths and provide ceiling timbers and props, as later set forth. This provision of a large platform advantageously provides for an adequate supply of timber, since the truck may be and often is operating at a great distance from a source of supply. If desired, a trailer loaded with timber and props and towed by the truck, may be employed to supplement the supply. The low level of the platform is also advantageous as it supports the timber sections at an elevation within easy reach of operatives working at the side of the truck, whereby the platform can be loaded and the timber sections thereon readily moved into position for sawing and then positioned on the boom cradle, as later set forth.

Figure 7:
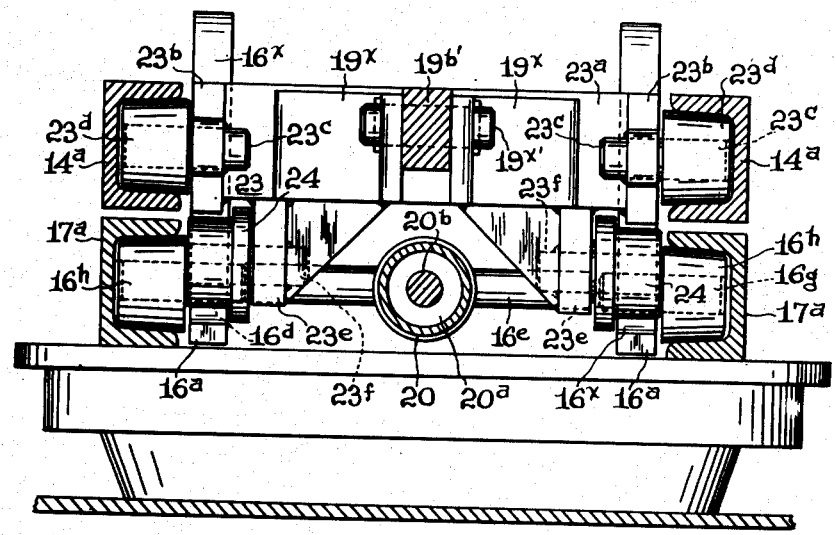
Fig. 7 is a section on the line 7—7 of Fig. 3, enlarged.
Figure 8:
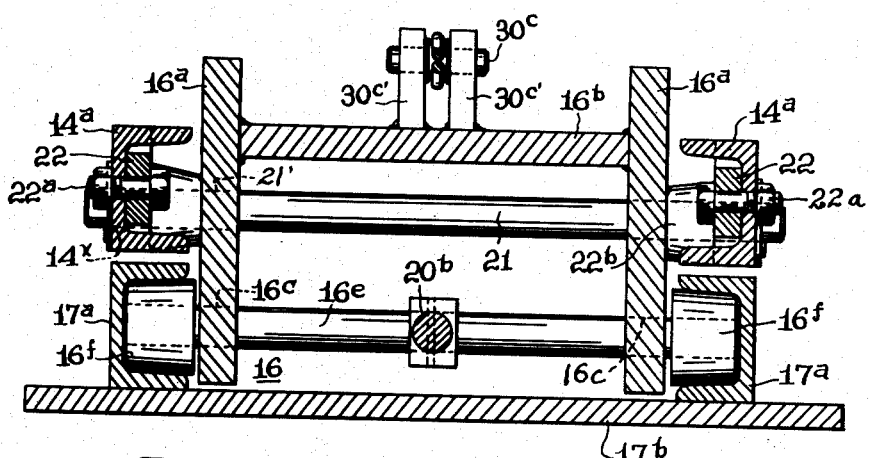
Fig. 8 is a section on the line 8—8 of Fig. 3, enlarged.

14 indicates as an entirety a boom mounted for bodily movement endwise and about a vertical axis on the chassis 1 and for swingable movement upwardly and downwardly and provided at its outer end with a cradle 15. The boom 14 consists of spaced parallel guides, such as channel members 14a, 14a', rigidly connected by cross members 14b, 14c, the members 14a, 14a', being pivotally mounted at their inner ends on a carriage, indicated as an entirety at 16, which in turn is mounted on a support 17 for movement rectilineally. The support 17 consists of channel members 17a suitably fixed to a plate 17b which is mounted on a turntable 18, whereby the carriage 16 and boom 14 may be slewed in either direction, as later set forth. Hydraulically operated means, indicated as an entirety at 19, are provided between the carriage 16 and boom 14 for swinging the latter upwardly and controlling its movement downwardly. The carriage 16 consists of a pair of spaced vertical plates 16a, 16a, rigidly connected adjacent their upper portions by a horizontal plate 16b. The rear ends of the carriage plates 16a and the forward portions thereof adjacent their lower edges are respectively formed with aligned openings 16c, 16d (Figs. 8 and 7, respectively). A shaft 16e extends through the openings 16c and outwardly of the plates it mounts rollers 16f which roll on the side walls of the channel members 17a, whereas stud shafts 16g, which are mounted in the openings 16d and extend outwardly of the plates 16a, support rollers 16h for engagement with the side walls of the channel members 17a. From the foregoing description it will be seen that the carriage 16 is mounted on pairs of rollers 16f, 16h, disposed at the rear and front ends of the carriage, which rollers engage with and are guided by the side walls of the channel members 17a when the carriage 16 is moved in either direction. As shown in Figs. 2, 4 and 7, the upper edges of the plates 16a serve as cams 16x for a purpose later set forth. The carriage 16 is shown in an intermediate position and may be moved in either direction along its supporting guides 17a by a fluid operated mechanism consisting of a cylinder 20 having a reciprocable piston 20a (Fig. 7), connected by a rod 20b to the shaft 16e, as shown in Figs. 3, 4 and 8. The outer end of the cylinder 20 is pivotally connected to a pair of lugs provided on a cross member 20c (Fig. 3). The member 20c is rigidly connected at its opposite ends to the outer ends of bars 20d. The inner ends of the bars 20d are fixedly connected to pads 20e which in turn fit within and are fixed to the inner walls of the channels 17a. This form of mounting for the outer end of the cylinder 20 provides clearance for parts of the mechanism for raising the boom 14. The cylinder 20 is provided with liquid connections at its opposite ends, so that by means of a control valve (later referred to), liquid under pressure is supplied to one end of the cylinder and liquid in the cylinder is discharged from its opposite end when the piston is to be moved in either direction.

The pivotal connection between the inner end of the boom 14 and carriage 16 consists of the following: 21 indicates a shaft extending through alined openings 21' formed in the plates 16a and alined openings 14x formed in the bottom walls of the channels 14a, 14a', cotter pins on the opposite ends of the shaft 21 serving to prevent endwise movement of the latter. 22 indicates a fitting between each plate 16a and the adjacent channel 14a, 14a'. As shown in Figs. 3 and 8, each fitting 22 is seated between the side walls of the adjacent channel and secured at one end to the bottom wall of the channel by a bolt 22a; the opposite end of each fitting terminates in a hollow boss 22b, alined with the adjacent openings 21', 14x, so as to provide a bearing for the adjacent end portion of the shaft 21. As will be understood, the shaft 21 forms a pivot for the boom 14 and as the shaft 21 is mounted on the carriage 16, the boom 14 moves therewith in either direction. The hydraulically operated mechanism 19 for raising the boom consists of the following: 19a indicates a cylinder the outer end of which is pivotally mounted between a pair of angle plates 14d secured to the inner side wall of the cross member 14c. The cylinder 19a is provided with a reciprocatable piston, which is connected to a rod 19b. The rod 19b is connected to a slide 23 movably mounted on the boom channels 14a, 14a', and operated outwardly by the piston in the cylinder 19a, the effect of which is to swing the boom upwardly. The outer end of the piston rod 19b is provided with an apertured lug 19b' fitting between the legs of angle members 19x fixed to the slide 23 and formed with alined openings, so that a pin 19x' extending through these openings and the lug 19b' serves to connect the piston rod 19b and slide 23 together (Figs. 3 and 7). The slide 23 consists of the following: 23a indicates a transversely disposed channel member provided at its opposite ends with plates 23b positioned inwardly of and parallel to the channels 14a, 14a'. The plates 23b extend beyond the opposite sides of the channel member 23a and the opposite ends of each plate 23b support stud shafts 23c which extend outwardly and rotatably support rollers 23d, the rollers 23d in turn having rolling engagement with the side walls of the adjacent channels 14a, 14a', 23e, 23e, indicate U-elements fixed to and depending from the bottom wall of the channel member 23a adjacent its opposite ends (Fig. 7). The bottom wall of each U-element supports a stud shaft 23f the outer end of which supports a flanged roller 24 arranged to engage and roll on the adjacent cam 15x (see Figs. 4 and 7). The cylinder 19a is connected by a pipe 19a' to a valve forming part of a valve mechanism indicated as an entirety at 25, mounted in the control station 6 (Fig. 1). The valve mechanism 25 forms part of a hydraulic system having a reservoir 25b for supplying fluid to the pumps 10a, 10a'. Operation of the valve in one direction supplies fluid under pressure to the cylinder 19a and operates the piston therein to move the slide 23 toward the left, as viewed in Figs. 2, 3 and 4; in such movement the rollers 24 will ride the cams 16x to the position shown in dotted lines in Fig. 4 and thus swing the boom upwardly. By supply of the fluid to the cylinder 19a, the boom 14 may be swung upwardly to position the cradle 15 at any desired height and upon reaching the desired elevation the boom may be maintained in such position by moving the valve to its neutral or cut-off position. In this position of the bottom 14 the carriage 16 may be bodily moved endwise to locate the cradle 15 in position to support a ceiling timber at the desired elevation; also, the support for the carriage 16 may be slewed in either direction, as later set forth, to adjust or swing the cradle laterally to locate the timber thereon in its final position. By operating the valve in the opposite direction, the pipe 19a' is connected to the return pipe 25x, so that pressure on the piston in the cylinder 19a is relieved to permit the boom 14 to gravitate to its lower position. By operation of the valve the boom 14 may be swung upwardly and downwardly to various intermediate positions in order to position the cradle in any desired elevated position.

The boom channel members 14a, 14a' are connected at their inner ends to the lower side of the cross member 14c and such connection is reinforced by side plates 14c' welded to the side walls of the channels 14a, 14a'. The outer ends of the channel members 14a, 14a' are provided with depending plates 26 formed with alined openings which support the outer ends of stud shafts 26a, mounted in the end portions of a cross member 26b, whereby the latter is free to rotate on a horizontal axis for a purpose later set forth. The cross member 26b is provided with a depending wall 26b' which at its lower end swingably supports the inner end of an arm 26c. The cross member 26b and arm 26c are formed with alined openings 26d the axes of which are disposed vertically and preferably intersect the axes of the shafts 26a. The openings 26d accommodate a shaft 27 about which the arm 26c swings. The upper portion of the opening in the member 26b is enlarged to form a shoulder 26d', whereas the lower portion of the shaft 27 is reduced to form a shoulder which seats on the shoulder 26d'. The lower end of the shaft 27 is provided with screw threads to take a nut 27a, which through a washer on the lower end of the shaft 27 engages a pad 26c' on the arm 26c to prevent endwise movement of the shaft 27 upwardly. The upper end of the shaft 27 is provided with spaced lugs 27b to accommodate a knuckle on a connector 28. The knuckle and lugs are formed with openings in which a pin 28a is mounted to pivotally connect the connector 28 to the shaft 27. The outer end portion of the connector 28 is screw threaded for threaded connection with the adjacent end of a turn buckle 29. The opposite end of the turn buckle 29 has threaded connection with the inner end of an eye bolt 30. The bolt 30 is connected to a loop 30a on the outer end of a cable 30b. The opposite end of the cable 30b is preferably connected in a similar manner to a pin 30c supported in standards 30c' fixed to the wall 16b of the carriage 16 (see Fig. 8). The connections above referred to between the shaft 27 and carriage 16 co-act with the boom 14, during swinging thereof, to maintain the arm 26c, which supports the cradle 15, in horizontal position, as shown in dotted lines in Fig. 4. The means for supporting the cradle 15 on the outer end of the arm 26c are preferably arranged to permit limited movement of the cradle relative thereto, so that in positioning and holding a ceiling member while props therefor are being set, the cradle 15 may adjust or accommodate itself to any unevenness in the mine ceiling. In the form of construction shown in Figs. 1a and 1b the supporting means for the cradle 15 consist of the following: 31 indicates an opening formed in the outer end portion of the arm 26c. 31a indicates a pedestal extending loosely through and rotatable in the opening 31 and suitably rigidly secured at its upper end to the cradle 15 at the intersection of its longitudinal and intermediate transverse axes. At its lower end the pedestal 31a is provided with a collar 31b having on its upper side a conical shape annulus 31c and arranged to engage the circumferential edge at the lower end of the opening 31. The collar 31b is engaged by a washer, which is secured by a nut 31b' against the shoulder on the reduced threaded end of the pedestal. 31d indicates a coiled compression spring surrounding the pedestal 31a and interposed between the arm 26c and cradle 15 and arranged to support the cradle in an elevated position; that is, with the collar 31b in engagement with the lower side of the arm 26c. The lower end of the spring 31d is seated within a ring 31e fixed to the arm 26c in concentric relation to the opening 31. The convolutions of the spring 31d are somewhat large as compared to the diameter of the pedestal 31, so that the spring will be strong enough to support the cradle when loaded with a timber and permit a limited amount of lateral swinging movement of the cradle 15 relative to the arm 26c, this latter movement of the cradle being provided for by the collar 31b in conjunction with the spring 31d the tension of which serves to bias the pedestal upwardly and maintain the collar 31b in engagement with the arm 26c. The cradle 15 consists of an elongated channel member.

From the foregoing description it will be noted that the cradle is so mounted on the outer end of the boom as to be (a) totally accessible to receive, hold and position timber sections, (b) freely rotatable on its support and the latter swingable to either side of the boom, whereby the cradle may be positioned in relation to the discharge side of the platform 1x, and (c) both the cradle and its support may be relatively moved, dependent on the angular position of the carriage support when a section of timber is to be transferred from the platform 1x to the cradle 15.

32 indicates as an entirety fluid operated means for slewing the carriage support, these means consisting of the following: 32a indicates a base plate suitably mounted on the chassis 1 (see Fig. 4) and formed with an axial opening 32b. The base plate 32a supports an annular wall 32c, the periphery of which is formed with a race for antifriction elements, such as balls, fitting a race formed in the annular depending flange 18a on the turntable 18. The turntable 18 is formed with an axial opening 18c through which and the opening 32b the fluid supply and discharge pipes for the cylinders 19a and 20 pass. The opening 18c is provided with a depending collar shaped to form a seat in which the hub of a pinion 32d is fixedly mounted. 33 indicates a rack engaging the pinion 32d and movable endwise to rotate the pinion and turntable 18, whereby the carriage support 17, carriage 16 and boom 14 may be slewed in either direction from the position shown in Fig. 3 through an arc of 90 degrees, to thereby provide a wide range of operation to meet various conditions in a mine. The rack 33 is provided with a shank 33a which terminates in a screw threaded end portion extending through an opening in one end portion of an operating plate 33b, the shank 33a being adjustably rigidly connected to the plate 33b by nuts 33c. The opposite end portion of the plate 33b is formed with an opening through which the outer end of a rod 34 extends, the rod being provided with a collar which abuts the inner side of the plate and having on its outer end a nut 34a which is tightened against the outer side of the plate 33b to secure the rod 34 thereto. The inner end of the rod 34 extends into a cylinder 35 and provided with a piston, so that by the supply of fluid under pressure to either end of the cylinder and discharge of the fluid from the opposite end thereof, the piston may be operated to effect movement of the plate 33b and move the rack 33 endwise. The plate 33b is guided in its movement so that the movement of the rack 33 by the piston rod 34 will be endwise and parallel thereto. The guide devices for the plate 33b preferably consist of a rod 36 and a sleeve 36x slidable thereon. The rod 36 is fixed to and supported at its outer end on the wall 1h'. The inner end of the rod 36 is secured to the upstanding wall of an angle shaped bracket 36b mounted on the bridge member 1i. The rod 36 extends through an opening 33b' formed in the plate 33b intermediate the connections of the rack shank 33a and piston rod 34 thereto. The sleeve 36x is fixedly supported in the opening 33b'. The sleeve 36x is elongated so as to have a long bearing on the rod 36 and thus maintain the plate 33b at right angles thereto. The outer end of the cylinder 35 is pivotally mounted between standards 35a which are bolted to an inverted channel 37. The channal 37 is welded to the adjacent side wall of the bridge member 1i and to the wall 1b (see Figs. 4 and 6).

As shown in Fig. 1 the valve mechanism 25 is mounted on the outer side of the chassis member 1e in the control station 6 and hence is accessible for operation by the driver when occupying either of the seats 6a, 6b. The valve mechanism 25 preferably consists of a casing to which is connected an inlet for fluid under pressure (not shown) leading from the pump 10a, valves having fluid connections with the cylinders 19a, 20a, 35, respectively, and a fluid return or outlet (not shown) connected to the reservoir 25b as shown at 25x'. 19x, 25c, 25d, indicate levers for operating the valves, whereby the piston movement in each cylinder 19a, 20a, 35 may be controlled. The valve mechanism is conventional for which reason it is not more fully illustrated.

The supply of current from the battery 8 to operate the motor 10 to drive the pumps 10a, 10a', is controlled by a suitable switch 10x suitably mounted on the housing wall 5x and provided with a handle 10x'. The handle 10x' is connected by a rod 10x" to an operating device 10z mounted on the inner side of the outer side wall 11a, whereby the pumps 10a, 10a', may be started and stopped by the driver at the control station 6 or by an operative working at the opposite side of the truck. 10y indicates a switch for lamps (not shown); the switches 10x and 10y are mounted on the wall 5x.

As already set forth, provision is made in the control station 6 for the driver, when occupying either seat 6a, 6b, to control the operation of the traction motor 9 by devices indicated as an entirety at 58, and braking of the truck travel and stoppage thereof by devices indicated as an entirety at 59. The devices 58, 59, form the subject-matter of my co-pending divisional application Ser. No. 178,450, filed August 9, 1940. Each of the devices 58, 59, include elements adapted to be manually engaged by the driver and similarly related to the seats 6a, 6b, so that operation and control of the truck is facilitated when the driver is in either seat.

The devices 58 consist of the following: 60, 60a, indicate foot pedals each suitably mounted on the floor 6c. The pedal 60 is adapted to be engaged by the right foot of the driver when he occupies seat 6a, whereas the pedal 60a is adapted to to be engaged by the left foot of the driver when he occupies the seat 6b. The pedals 60, 60a, are connected together by a link 61, one end of which (that end remote from the pedal 60a) is operatively connected to the shaft of a controller, which is mounted in a casing 63, so that (a) when the driver is occupying seat 6b and pushes pedal 60a clockwise (as viewed in Fig. 1), to rotate the controller and drive the motor 9 in a direction to propel the truck in the forward direction; and (b) when the driver occupies the seat 6a and pushes pedal 60 counter-clockwise, the controller will be rotated in the opposite direction to propel the truck rearwardly.

The devices 59 consist of the following: 68, 68a, indicate pedals mounted on the floor 6c similarly to the pedals 60, 60a, and inclined at the same angle and each in transverse alinement to one of the latter pedals. In this arrangement, when the driver is occupying the seat 6b, he uses his right foot to engage and swing the pedal 68a in a clockwise direction to brake the movement of the truck and when the driver is occupying the seat 6a, he uses his left foot to engage and swing the pedal 68 in a counterclockwise direction to brake the travel of the truck.

From the following description it will be observed that the steering wheel 38a is disposed midway the seats 6a, 6b, and that each set of pedals 60—68 or 60a—68a bears the same relation to the seat remote therefrom, so that the operation of the devices to control the driving of the truck is facilitated when the driver is in either seat 6a, 6b. The pedals 68, 68a, are operatively connected to one end of a cable 72, engaging pulleys 72a, 72b, and connected at its opposite end to the movable member 68x" of the brake 68 x. The movable member 68" is biased in one direction by a spring 68x', to maintain the braking element or elements (not shown) in inoperative position, but is put under tension when either pedal 68, 68a, is operated to control or stop truck travel. In this arrangement, the spring 68' serves to return the pedals to normal position when foot pressure on either thereof is relieved.

Figs. 9 and 10 show a modified form of boom wherein the outer ends of the channel members 14a, 14a', are connected through a casting 14e to the inner ends of a pair of converging members 14e'. The members 14e' are rigidly connected at their outer ends to a vertical plate 14f. The lower end of the plate 14f is rigidly connected to the inner end of an inverted channel 14g. The outer end of the channel 14g is provided with a pair of parallel arms 14g', on which is swingably and revolvably mounted the support 26c for the cradle 15, the support being connected with the boom substantially similarly to like parts shown in Figs. 1a, 1b and 4, whereby the cradle is maintained horizontal in all positions of the boom and capable of being swung horizontally relative to the boom into desirable positions. By providing at the outer end of the boom converging members 14e' and supporting thereon the central extension channel 14g, it will be observed that the boom may be slewed to the position shown in dotted lines in Fig. 10 to position the cradle in close relation to the truck chassis and also disposed parallel to and in a plane extending within the outer side of the chassis to facilitate the positioning of a section of timber on the cradle. In this form of construction the cradle 15 is supported on the arm 26c in the following manner (see Fig. 11): 102 indicates a hollow upright member suitably fixed to the outer end of the arm 26c, the upper end 102a of the member 102 being rounded in cross section throughout its circumference. Intermediate its upper and lower ends the member 102 is provided interiorly with an annulus 103 suitably fixed to the inner wall of the member 102. A rod 104 extends through the annulus 103 and is rigidly secured at its upper end to the cradle 15 at the intersection of its longitudinal and intermediate transverse axes and provided at its lower end below the annulus 103 with a head 105. 106 indicates a ring suitably fixed to the under side of the cradle 15 in concentric relation to the rod 104. The lower side of the ring 106 is beveled or of conical shape as shown at 106a and adapted to engage with and rest on the end 102a. The head 105 consists of a collar 105a having a conical upper surface spaced from the annulus 103 when the ring 106 is in engagement with the end wall 102a and the rod 104 is disposed axially of the member 102. The collar 105a is seated against a shoulder formed by the reduced end of the rod 104 by a nut 107 threaded on the end portion of the rod and operating through a washer 107a to secure the collar in position. It will be noted that in the normal position of the head 105 (as shown in Fig. 11) it is spaced from the annulus 103 and that the inner diameter of the latter is somewhat larger than that of the rod 104, which arrangement permits the bevel wall 106a to slide on the end 102a, whereby the cradle 15, when raised by the boom, may adjust itself to uneven or distorted ceiling conditions in positioning and/or holding a section of timber while being propped in final position.

Figure 13:
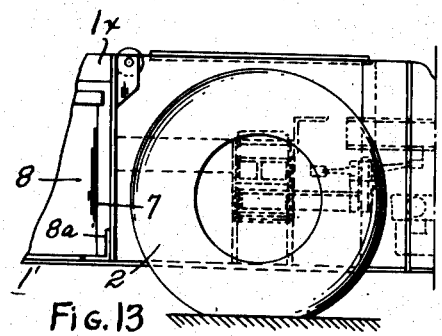

Figs. 12, 13 and 14, show a modified form of construction. The chassis 1' is substantially similar in construction to that shown in Figs. 1a and 2, 2a, but modified to mount the boom outwardly of the wheels 2 (see Fig. 13) to support the boom 14 on a relatively low level to meet various conditions in a mine and facilitate positioning of timbers or ceiling members on the cradle 15. In this form of construction, (a) the plate or turn-table for the support, on which the boom carriage is slidable, is rotatably mounted on the annular member 32x and the latter in turn is supported by a base 80 and (b) the mechanism for slewing the plate or turn-table is disposed transversely, as shown in Figs. 12 and 14. The base 80 is supported by an angle 80a and brackets 80b suitably fixed to the front wall of the guard 4'. As shown in Figs. 13 and 14, the upper side of the boom 14 is disposed below the plane of the platform 1x' and cradle 15 and therefore permits the timbers to be slid from the platform over the boom onto the cradle 15. In carrying out this operation the boom cradle 15 is positioned as shown in dotted lines in Figs. 12 and 14.

The boom channels 14a, 14a', are provided with pairs of hangers 81, each pair thereof supporting a transverse roller 81a to facilitate movement of the timber sections from the platform 1x' to the cradle 15.

*Operation.*—The truck is driven to the mine seam where the mine deposit (coal or other material) has been excavated and removed. A supply of timber, bars, props may be carried on the truck platform or on a trailer towed by the truck. Next, a roofing timber is selected and positioned on the cradle 15; if found necessary, the timber is first positioned over the slot 13x (see Fig. 2) and the saw operated to saw the timber crosswise to a predetermined length and/or one side of the timber may be cut off to provide flat prop engaging surfaces. Next, the boom and cradle thereon are operated to so position the latter that a timber may be slid thereon or placed on the cradle manually. Next, the boom is operated to swing the cradle upwardly and the boom carriage is adjusted rectilinearly to insure accurate placement of the timber in its final set relation to the mine roof. Next, the height of the timber from the ground in its set position is determined and props are then positioned over the slot 13x and the saw operated to saw each prop crosswise to the desired length. The props are then placed below the end portions of the timber and wedged into final position. Next, the boom is lowered and the truck driven forwardly or backwardly into position to raise and set the succeeding timber in position.

To those skilled in the art to which my invention relates many changes in construction and widely differing embodiments and applications of the invention will suggest themselves without departing from the spirit and scope of the invention. My disclosures and the description herein are purely illustrative and are not intended to be in any sense limiting.

What I claim is:

1. In a truck, the combination of a chassis mounted on pairs of wheels, one of said pairs of wheels being steerable, said chassis consisting of vertically disposed spaced plates extending longitudinally and transversely of said chassis, a support on the tops of said plates adjacent the forward end of said chassis, a platform on the tops of said plates rearward of said support, said plates terminating at their upper ends in a plane closely adjacent the tops of said wheels to mount said support and platform at a low level, a motor for driving said other pair of wheels and a power supply for said motor mounted on said plates below said platform, a reservoir for liquid, a pump, a motor for driving said pump, connected to said power supply, mounted on said plates below said platform, a boom swingably mounted at one end on said support and provided with a cradle at its opposite end, hydraulically operated means for swinging said boom upwardly, a control station at one side of said chassis and having a flooring supported by certain of said plates on a level below said platform, manually operated devices in said control station for operating said first mentioned motor, a liquid supply and discharge system between said reservoir, said pump and said hydraulically operated means, and a valve in said control station for controlling the supply of liquid under pressure from said pump to said hydraulically operated means and discharge of the liquid from the latter to said reservoir.

2. A self-propelled truck having, in combination, a chassis mounted on pairs of driven and steerable wheels, a support on and adjacent one end of said chassis and having an annular bearing, a pair of spaced channel members provided at their inner ends with a turn-table mounted on said bearing, means for rotating said turn-table, a carriage slidably mounted on said channel members, cylinder-piston elements mounted within said channel members and connected to said carriage for moving it rectilineally thereof, a boom pivotally mounted at its inner end on said carriage and consisting of a pair of channel members, spaced cams mounted on said carriage in parallel relation to said first mentioned channel members and extending from a point adjacent the pivot for said boom outwardly and downwardly, a separate carriage slidably mounted on said last mentioned channel members and provided with rolls arranged to engage and ride on said cams, cylinder-piston elements disposed in the plane of said separate carriage and respectively connected to said last mentioned channel members and said separate carriage for moving the latter rectilineally of said last mentioned channel members, whereby said cams through said rolls swing said boom upwardly, a cradle mounted on the outer end of said boom, and a source of supply of fluid under pressure provided with separately valve controlled connections connected to said cylinders, respectively.

3. A self-propelled truck having, in combination, a frame mounted on pairs of driven and steerable wheels, a support on and adjacent one end of said frame and provided with an annular bearing, a pair of spaced opposed channel members connected at their inner end portions to a turn-table, mounted on said bearing and extending outwardly therefrom beyond the adjacent end of said frame, means for rotating said turn-table, a carriage between said channel members and provided with spaced, fixedly related, vertically disposed elongated plates, the upper edges of said plates along their forward portions being curved outwardly and downwardly to form cams, pairs of inner and outer pairs of rolls mounted on the outer sides of said plates and engaging the walls of said channel members for movement endwise thereof, cylinder-piston elements mounted between said channel members and respectively connected to said channel members and carriage for moving the latter endwise of said channel members, a boom pivotally mounted at its inner end on said plates rearwardly of said cams and consisting of a pair of spaced opposed channel members extending outwardly beyond said first mentioned channel members, a separate carriage disposed between said last mentioned channel members and provided on its opposite outer sides with inner and outer pairs of rolls engaging the walls of said last mentioned channel members for movement endwise thereof, a separate pair of rolls mounted on said separate carriage in the plane of said cams and arranged to engage with and ride thereon during movement of said separate carriage in either direction, cylinder-piston elements mounted between said last mentioned channel members and respectively connected to the latter and said separate carriage for moving said carriage endwise rearwardly and forwardly of said channel members, the movement of said separate carriage operating through the engagement of said separate pair of rolls with said cams to swing said boom upwardly, a cradle mounted on the outer end of said boom, mechanism for supplying fluid under pressure, and valve controlled fluid connections between said fluid supply and each of said cylinders.

4. A truck as claimed in claim 2 wherein the outer end of said boom is provided with a depending support for said cradle swingable on a transverse axis and having an elongated arm mounted at its inner end on said support to swing on an axis perpendicular to said transverse axis and mounting said cradle at its outer end, said mounting including related annular walls to permit said cradle to be adjusted dependent on uneven surface conditions in a mine ceiling, and connections between said boom and said support for maintaining said arm horizontal during swinging movement of said boom.

5. A self-propelled truck having, in combination, a frame mounted on pairs of driven and steerable wheels, a support on and adjacent one end of said frame, a turn-table mounted on said support, a pair of spaced, parallel connected-together vertically disposed plates mounted on said turn-table, the forward edges of which are curved outwardly and downwardly to form cams, a boom pivotally mounted at its inner end on said plates rearwardly of said cams and consisting of spaced opposed channel members extending outwardly beyond the adjacent end of said frame, a cradle mounted on the outer end of said boom, a carriage disposed between said channel members and provided on its outer sides with forward and rearward pairs of rolls engaging the inner walls of said channel members to slidably support said carriage thereon, a separate pair of rolls on and below said carriage and disposed in the plane of said cams and arranged to engage with and ride thereon during movement of said carriage in either direction, cylinder-piston elements disposed between said channel members and respectively connected to said channel members and said carriage for moving the latter endwise of said channel members, whereby movement of said carriage rearwardly operates through the engagement of said separate pair of rolls with said cams to swing said boom upwardly, a source of fluid supply under pressure, and valve controlled fluid connections between said fluid supply and said cylinder.

6. A truck as claimed in claim 2 wherein said cradle is swingably mounted on a transverse axis on said boom and connections are provided between said boom and cradle for maintaining the latter horizontal during swinging movement of said boom.

7. A truck as claimed in claim 2 wherein a depending support is mounted on a transverse axis on the outer end of said boom and an elongated arm carrying said cradle on its outer end, is swingably connected at its inner end to the lower end of said support to swing about a vertical axis.

8. A truck as claimed in claim 1 wherein the outer end portion of said boom is offset and disposed in a plane parallel to its inner portion and said cradle is movably mounted on the outer end of said offset portion.

References Cited in the file of this patent

UNITED STATES PATENTS

| Number | Name | Date |
|---|---|---|
| 923,326 | Bullard | June 1, 1909 |
| 1,389,021 | Vest | Aug. 30, 1921 |
| 1,681,319 | Bartlett | Aug. 21, 1928 |
| 1,861,194 | Sloane | May 31, 1932 |
| 1,930,694 | Sloane | Oct. 17, 1933 |
| 2,073,998 | Raby | Mar. 16, 1937 |
| 2,321,406 | Merchant | June 8, 1943 |
| 2,332,546 | Arentzen | Oct. 26, 1943 |
| 2,384,890 | Coldwell | Sept. 18, 1945 |
| 2,396,161 | Cullen | Mar. 5, 1946 |
| 2,408,387 | Gay et al. | Oct. 1, 1946 |
| 2,413,096 | Barker | Dec. 24, 1946 |
| 2,501,112 | Webster | Mar. 21, 1950 |